Oct. 17, 1944.   F. W. QUIDAS   2,360,384
WEIGHING SCALE
Filed April 19, 1940   2 Sheets-Sheet 2
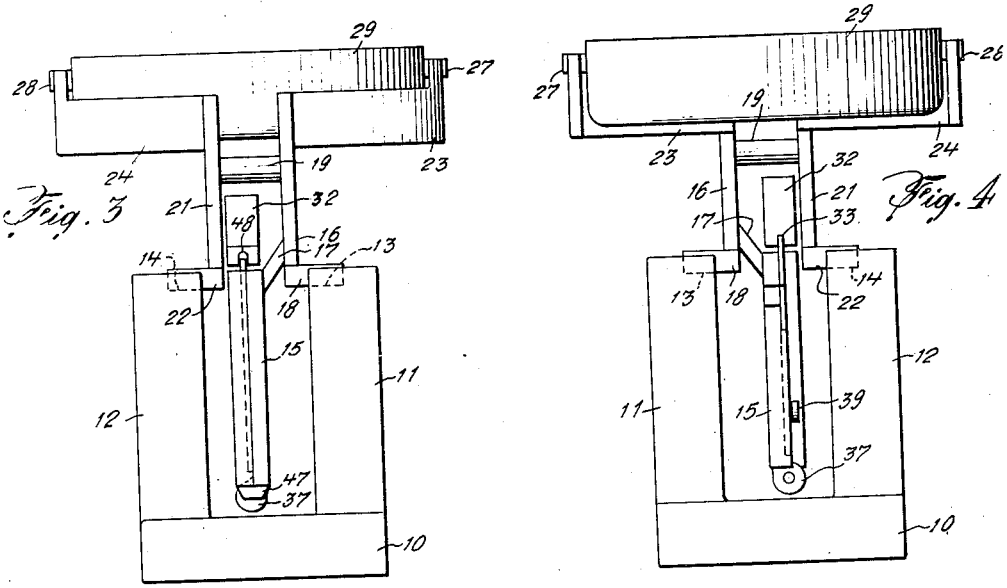
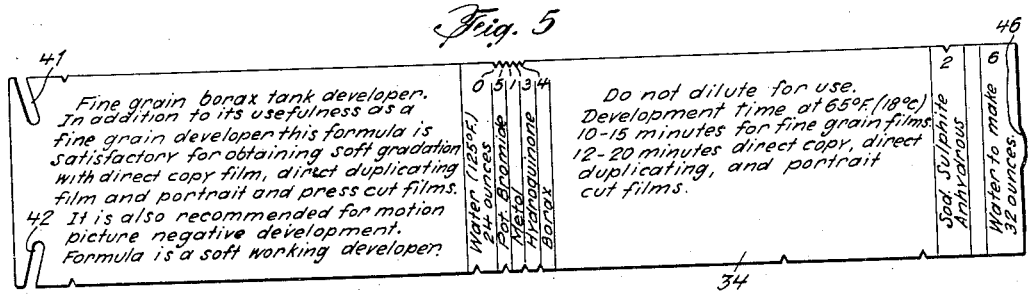
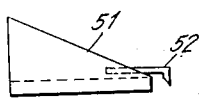  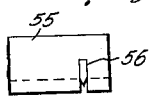
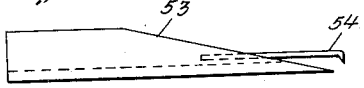 
INVENTOR.
Frederick W. Quidas
BY Benjamin Webster
Attorney Patented Oct. 17, 1944

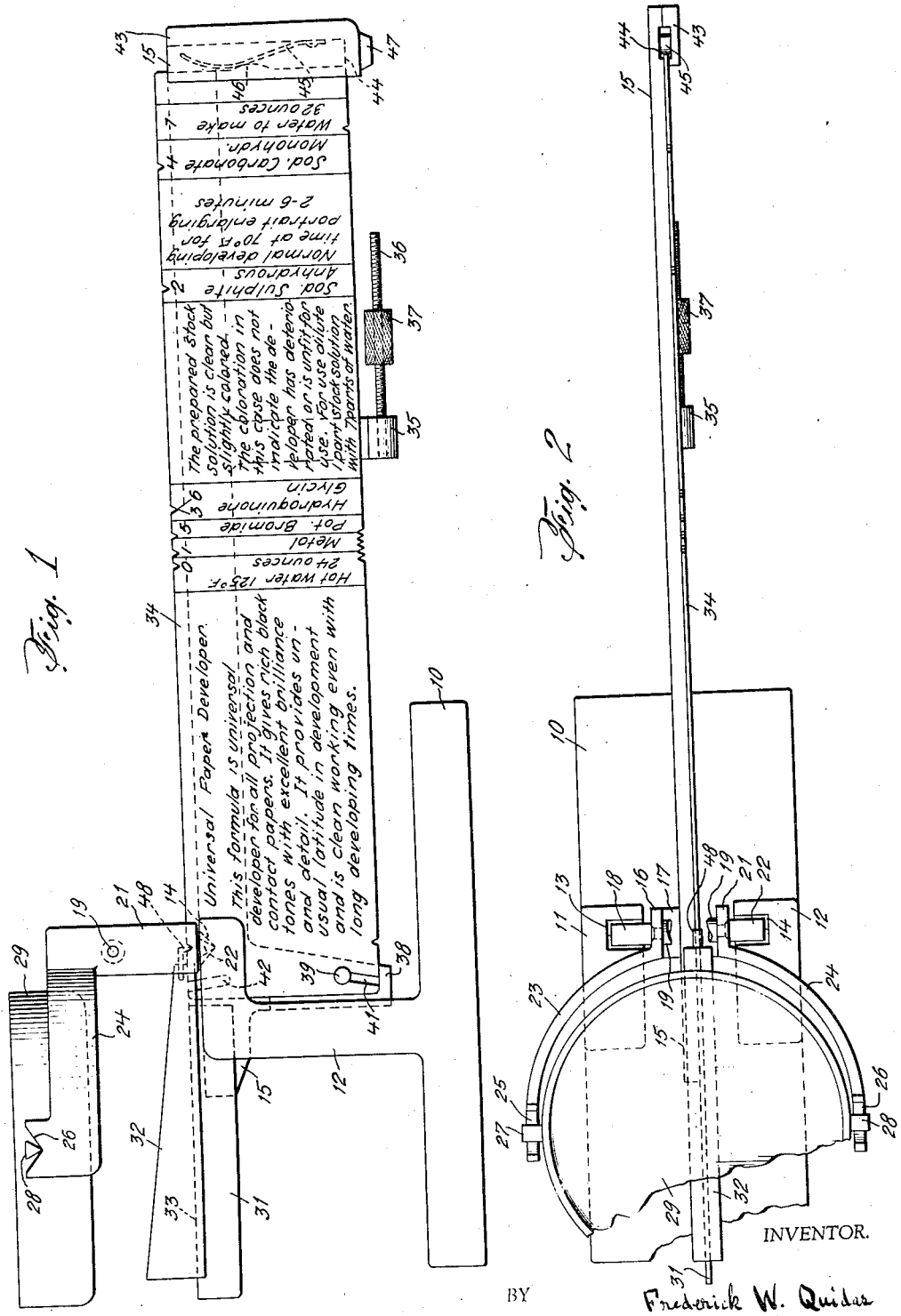

2,360,384

UNITED STATES PATENT OFFICE 2,360,384

WEIGHING SCALE

Frederick W. Quidas, New York, N. Y.

Application April 19, 1940, Serial No. 330,495

5 Claims. (Cl. 265—30)

The invention relates to weighing scales of the type having a pan on one arm of a scale beam and a poise weight slidable on the other arm. It has for one of its main objects to provide a pair of scales by means of which mixtures can be compounded from formulas without any danger of miscalculating the amount of any of the ingredients called for by the formula and without the danger of adding the ingredients of the formula in the wrong sequence. Another object is to so construct the scales that by simply substituting one part for another on the scale, or by merely turning this part over, ingredients named in other and different formulas may be weighed out.

This invention is a modification of that disclosed in my Patent No. 2,206,919, dated July 9, 1940.

A further object is to so construct these removable and interchangeable parts that the ingredients of the formulas may be imprinted directly on these parts, so that the formula will always be available when needed.

A still further object is to provide a scale which may be used for various systems of weight, such as for example metric, troy or avoirdupois, by merely substituting one part for another. Additional objects are to provide a scale which will be accurate in its operation, simple in construction, easy to manipulate, and on which very small quantities may be measured due to the particular construction of the sliding poise weight employed.

A photographic chemical solution in water is usually made by adding and thoroly dissolving chemicals, one at a time by weight, from a predetermined formula. An important rule for trouble-free solutions is that of mixing all the components of a solution in the order listed in the formula; failure to follow this rule can easily result in the formation of precipitates which will not dissolve in the solution. The ingredients of formulas vary from minute to large weights and must be weighed in the order given in the formula so that a single scale beam arm with a single poise weight would require a total length too great and the scale subdivisions be too small to be practical with the poise weights heretofore commonly used.

To solve this problem of weighing scales for the photographer a plurality of graduated scale beams with a poise weight on each have been employed.

An important object of this invention is to provide a single poise weight on a single scale beam arm such that both grain weights and ounce weights can be weighed on a single scale beam which is short enough to be practical for photographers, real or amateur, or in other words wherein as viewed from the fulcrum and looking along the beam arm the effect is like to foreshortening. In a photographic formula the weights of the ingredients may range from 10 grains to 4 ounces, or the largest weight may be 175 times the smallest weight, and if the scale beam is graduated 32 notches per linear inch, each notch representing 1 grain, a scale beam length of 55 inches is required, in other words an impractical length.

Moreover in applying to the scale beam arm a notched chart plate giving complete instructions and data for compounding the formula to be made, with notches for the poise positioned for required weights and with indicia giving the order of weighing the ingredients as directed in the formula, it is an important object of the invention to provide a substantial space on the chart for general information and instructions pertinent to a formula to be used; and since the scale beam arm is more sensitive to a poise weight the more removed the latter is from the fulcrum it is obviously desirable to leave a substantial space on the chart free from poise weight notches and their indicia adjacent the portion of the scale beam arm that lies near the fulcrum. To accomplish this purpose the center of gravity of the poise weight made according to this invention is offset on the side toward the fulcrum of the scales; a poise weight formed of sheet metal, such as sheet brass, in the general form of a right triangle in which the vertical leg is much shorter than the horizontal leg and is toward the fulcrum of the scales, is a simple and practical embodiment of this invention. The increase of the length of the horizontal leg of the triangular poise weight, or in other words the offsetting of the center of gravity of the poise weight may be increased in proportion to the greatest weight of an ingredient in a formula, so that a scale beam arm need not extend more than ten or twelve inches to one side of the fulcrum.

In the balanced position of the scales the poise weight made according to this invention may be placed with its center of gravity at the side of the scales fulcrum opposite to the beam arm carrying the chart, or approximately at the fulcrum. Thereafter movement of the poise weight outwardly on the chart arm increases the weight required in the weighing pan to counterbalance the poise weight. The notches in the chart plates may be determined empirically for any given formula by using the required weights in the weighing pan.

Another object of the invention is to provide a means for quickly and precisely mounting chart plates on the scale beam arm or removing them for substitution, reversing, or replacement.

These and various other objects and advantages will be readily understood from the following description and from the accompanying drawings, in which modifications may be made without departing from the spirit and scope of the invention.

Reference is made to the drawings in which

Figure 1 is a side elevation.

Figure 2 is a plan.

Figure 3 is a right end view.

Figure 4 is a left end view.

Figure 5 is a view of the opposite side of the chart plate inverted with reference to Figure 1.

Figure 6 and Figure 7 are side and end views respectively of a modified poise weight.

Figure 8 and Figure 9 are side and end views of another form of poise weight.

Figure 10 is a side view of still another modification of the poise weight.

In the preferred form of weighing scales shown in the drawings, a base 10 has a flat bottom and two vertical pedestals 11 and 12 which are spaced apart and which have in the upper walls of the top right-angled projections transverse aligned V-shaped grooves 13 and 14. The scale beam includes an arm 15 which is positioned between the pedestals 11 and 12 and, altho most of the arm 15 lies to the right of the fulcrum, a short end extends to the left. An arm 16 extends vertically upward from, but at the side of the arm 15 to which it is rigidly secured by a connector 17. A transverse knife edge 18 is rigidly attached to the bottom of the arm 16 and pivotally seats in the groove 13. A cross-piece 19 is rigidly secured to the arm 16 and to an arm 21, which is similar to the arm 16 and is symmetrically disposed thereto, and which rigidly supports at its bottom a knife edge 22, similar to and aligned with the knife edge 18, and pivoted in the groove 14. An arcuate arm 23 is rigidly mounted on the top of the arm 16 and extends outwardly and to the left and rearwardly in a horizontal plane, and a similar arcuate arm 24 is rigidly mounted on the top of the arm 21 and extends outwardly and to the left and forwardly in the same horizontal plane. Aligned transverse grooves 25 and 26 on the ends of arms 23 and 24 pivotally support knife edges 27 and 28 secured at opposite sides of the weighing receptacle 29.

A small rectangular plate 31 extends from and is rigidly secured on the left end of the beam 15 to support a poise weight 32 at the left of the knife edges 18 and 22 of the scale beam. A lengthwise vertical recess 33 is formed in the center of the bottom of the poise 32 and is adapted to fit over the top horizontal straight edge of the plate 31 and also to fit over a notched chart plate 34 removably mounted on the front face of the arm 15.

An arm 35 depending from the arm 15 mounts at the bottom a screw 36 disposed parallel with the arm 15, on which a balancing nut 37 is adjustably mounted. An arm 38 depends from the arm 15 at the left and provides a right-angled pocket for engagement by the left end of the plate 34, which arm 38 supports on the front face a headed stud 39 adapted to mount the end of the plate 34 in one of the slots 41 or 42 formed in and near the left end of the plate 34.

An arm 43 depending from the right end of the arm 15 provides in the left wall a vertical slot 44 to receive the right end of the plate 34. A spring 45 secured on the inner vertical wall of the slot 44 has an outward bow above the center which is adapted to overlie and press on the upper edge of a central symmetrical arc-shaped projection 46 from the right end of the plate 34. A downward projection 47 on the bottom of the arm 43 may provide a bumper for the scale arm 15.

The top straight edge of the plate 34 has a series of notches, positioned according to the weights of the ingredients of each separate formula, and which are engaged by a finger 48 mounted on the poise 32 and coincident with the groove 33. The notch at the left is used for the finger in the balanced position of the scale with the receptacle 29 empty. The arabic numerals from 0 to 7 indicate to the photographer the order of weighing the ingredients of a formula with the ingredients indicated below the numerals so that the formula can be compounded without the need of consulting any other chart or book. The space on the plate 34 at the left is used for general instructions and an additional space toward the right may carry further instructions.

In compounding the formula shown in Figure 1 the ingredients are weighed, one at a time, by moving the poise 32 to position the finger 48 in each of the notches one at a time in the order named by the numerals, filling the receptacle 29 with one ingredient until the scale balances, transposing the ingredient to a mixing bottle, and shaking the bottle.

Figure 5 shows the notches and the indicia on the back of the plate 34, which has been withdrawn from the position shown in Figure 1, inverted and again positioned on the arm 15 to give another and different formula. Any desired number of similar plates may be made up and kept accessible to the photographer which are prepared for other formulas with a different suitable arrangement of notches for the required weights and suitably arranged arabic numerals for the required order of weighing.

In Figure 6 is shown a poise 51 in the general form of a right triangle and having a finger 52 to engage the notches on a chart plate. In Figure 7 is an end view showing outwardly and upwardly flaring side walls. In Figures 8 and 9 is shown a poise 53 of combined rectangular and triangular form having a finger 54 for engaging the plate notches. In Figure 10 a poise 55 is shown that is rectangular in shape and having a finger 56 within the poise.

Having shown and described my invention, and realizing that, in view of my disclosure many omissions, substitutions, or modifications of parts, and changes in material, will readily occur to those skilled in the art I do not limit myself to the exact forms shown.

I claim:

1. In a weighing scale having a base and a pedestal, in combination, an elongated plate, a scale beam poised on said pedestal and having a removable scale receptacle at one end and means on the other end for removably supporting said plate longitudinally with the beam, indentations formed in said plate, and a weight mounted for sliding movement longitudinally of said plate and said beam and having means engageable in said indentations, said indentations spaced to correspond to the weights of the various ingredients of a mixture to be compounded, said weight being supported at a plurality of points longitudinally of its length and having its center of gravity offset away from the free outer end of the scale beam; the plate having two spaced apart points of support on the scale beam, and means for securing the plate in a precise predetermined relationship to the scale beam, comprising a pin and slot connection for reversibly mounting the plate on said scale beam, and a spring carried by said beam and engageable with said plate.

2. In a weighing scale having a base and a pedestal, in combination, an elongated plate, a scale beam poised on said pedestal and having a removable scale pan at one end and means on the other end for removably supporting said plate longitudinally with the beam, indentations formed in said plate, a weight mounted for sliding movement longitudinally of said plate and said beam and having means engageable in said indentations, said indentations spaced to correspond to the weights of the various ingredients of a mixture to be compounded, said weight being supported at a plurality of points longitudinally of its length and having its mass progressively increased away from the free outer end of the scale beam, said weight being formed of sheet metal; the plate having two spaced apart points of support on the scale beam, and means for securing the plate in a precise predetermined relationship to the scale beam, comprising a pin and slot connection for reversibly mounting the plate on said scale beam, and a spring carried by said beam and engageable with said plate.

3. In a weighing scale having a base and a pedestal, in combination, an elongated plate, a scale beam poised on said pedestal and having a removable scale pan at one end and means on the other end for removably supporting said plate longitudinally with the beam, indentations formed in said plate, a weight mounted for sliding movement longitudinally of said plate and said beam and having means engageable in said indentations, said indentations spaced to correspond to the weights of the various ingredients of a mixture to be compounded, said weight being supported at a plurality of points longitudinally of its length and having its mass progressively increased away from the free outer end of the scale beam, said weight being in the form of a triangle with the hypotenuse inclined upwardly toward the fulcrum of the scale beam; the plate having two spaced apart points of support on the scale beam, and means for securing the plate in a precise predetermined relationship to the scale beam, comprising a pin and slot connection for reversibly mounting the plate on said scale beam, and a spring carried by said beam and engageable with said plate.

4. In a weighing scale having a base and a pedestal, in combination, an elongated plate, a scale beam poised on said pedestal and having a removable scale pan at one end and means on the other end for removably supporting said plate longitudinally with the beam, indentations formed in said plate, a weight mounted for sliding movement longitudinally of said plate and said beam and having means engageable in said indentations, said indentations spaced to correspond to the weights of the various ingredients of a mixture to be compounded, said weight having its mass progressively increased away from the free outer end of the scale beam, said weight being in the form of a right triangle having one leg supported at a plurality of points; the plate having two spaced apart points of support on the scale beam, and means for securing the plate in a precise predetermined relationship to the scale beam, comprising a pin and slot connection for reversibly mounting the plate on said scale beam, and a spring carried by said beam and engageable with said plate.

5. In a weighing scale having a base and a pedestal, in combination, an elongated plate, a scale beam poised on said pedestal and having a removable scale pan at one end and means on the other end for removably supporting said plate longitudinally with the beam, indentations formed in said plate, a weight mounted for sliding movement longitudinally of said plate and said beam and having means engageable in said indentations, said indentations spaced to correspond to the weights of the various ingredients of a mixture to be compounded, said weight having its mass progressively increased away from the free outer end of the scale beam, and means for so mounting the weight on the plate that in the balanced position of the scale beam a part of the weight is at the side of the fulcrum of the scales opposite to the scale beam arm; the plate having two spaced apart points of support on the scale beam, and means for securing the plate in a precise predetermined relationship to the scale beam, comprising a pin and slot connection for reversibly mounting the plate on said scale beam, and a spring carried by said beam and engageable with said plate.

FREDERICK W. QUIDAS.